United States Patent
Peng et al.

(10) Patent No.: US 12,308,759 B2
(45) Date of Patent: May 20, 2025

(54) POWER CONVERTER

(71) Applicant: CHICONY POWER TECHNOLOGY CO., LTD., New Taipei (TW)

(72) Inventors: Tso-Jen Peng, New Taipei (TW); Mao-Song Pan, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 264 days.

(21) Appl. No.: 18/081,113

(22) Filed: Dec. 14, 2022

(65) Prior Publication Data

US 2024/0088799 A1 Mar. 14, 2024

(30) Foreign Application Priority Data

Sep. 12, 2022 (TW) .................................. 111134390
Oct. 24, 2022 (TW) .................................. 111140265

(51) Int. Cl.
*H02M 7/217* (2006.01)
*H02M 1/00* (2006.01)
(Continued)

(52) U.S. Cl.
CPC ......... *H02M 7/219* (2013.01); *H02M 1/0003* (2021.05); *H02M 1/007* (2021.05);
(Continued)

(58) Field of Classification Search
CPC ...... H02M 1/0003; H02M 1/007; H02M 1/42; H02M 1/4208; H02M 3/158; H02M 3/335;
(Continued)

(56) References Cited

U.S. PATENT DOCUMENTS 5,465,011 A * 11/1995 Miller .................... H02J 9/062
                                                      307/64
9,647,555 B2 * 5/2017 Kooken .............. H02M 1/4225
(Continued)

FOREIGN PATENT DOCUMENTS

| CN | 104467443 A | 3/2015 |
|---|---|---|
| CN | 108258910 A | 7/2018 |

(Continued)

OTHER PUBLICATIONS

Office Action dated Jul. 11, 2023 of the corresponding Taiwan patent application No. 111134390, 8 pages.
(Continued)

*Primary Examiner* — Gary L Laxton
(74) *Attorney, Agent, or Firm* — Muncy, Geissler, Olds & Lowe, P.C.

(57) ABSTRACT

A power converter includes a primary-side rectifying/filtering circuit, a DC converter, a DC/DC converter, a primary-side controller, a secondary-side rectifying controller, and a secondary-side feedback controller. The primary-side rectifying/filtering circuit receives an input voltage, and rectifies and filters the input voltage into an adjusted input voltage. The DC converter receives the adjusted input voltage. The primary-side controller provides a first control signal to control the DC converter to convert the adjusted input voltage into a DC input voltage, and provides a second control signal to control the DC-DC converter. The secondary-side rectifying controller provides a third control signal to control the DC-DC converter to convert the DC input voltage into a conversion voltage to supply power to a load according to a gain condition. The secondary-side feedback controller receives a power demand signal provided by the load to control the primary-side controller and the secondary-side rectifying controller.

20 Claims, 4 Drawing Sheets

(51) Int. Cl.
  *H02M 1/42* (2007.01)
  *H02M 3/00* (2006.01)
  *H02M 3/158* (2006.01)
  *H02M 3/335* (2006.01)
  *H02M 7/219* (2006.01)

(52) U.S. Cl.
  CPC ............ *H02M 1/4208* (2013.01); *H02M 3/01* (2021.05); *H02M 3/158* (2013.01); *H02M 3/33571* (2021.05); *H02M 3/33573* (2021.05); *H02M 3/33592* (2013.01)

(58) Field of Classification Search
  CPC ......... H02M 3/33569; H02M 3/33571; H02M 3/33576; H02M 7/219; H02M 3/33573
  See application file for complete search history.

(56) References Cited

U.S. PATENT DOCUMENTS

| | | |
|---|---|---|
| 9,812,977 B2 | 11/2017 | Ye et al. |
| 10,389,233 B1 | 8/2019 | Lim |
| 2006/0133119 A1 | 6/2006 | Nomura et al. |
| 2010/0165684 A1* | 7/2010 | Chen ................. H02M 1/10 |
| | | 363/127 |
| 2015/0098254 A1 | 4/2015 | Brinlee et al. |
| 2015/0162840 A1 | 6/2015 | Frost et al. |
| 2017/0117813 A1* | 4/2017 | Lee ................. H02M 3/33523 |
| 2018/0222333 A1 | 8/2018 | Khaligh et al. |
| 2022/0069722 A1* | 3/2022 | Pan ................. H02M 1/0009 |
| 2022/0149744 A1 | 5/2022 | Huber et al. |

FOREIGN PATENT DOCUMENTS

| | | |
|---|---|---|
| CN | 110504847 A | 11/2019 |
| CN | 113452260 A | 9/2021 |
| CN | 113746341 A | 12/2021 |
| TW | I325681 B | 6/2010 |
| TW | 201027892 A | 7/2010 |
| TW | 201041287 A | 11/2010 |
| TW | 201105018 A | 2/2011 |
| TW | 202019070 A | 5/2020 |

OTHER PUBLICATIONS

Office Action dated May 3, 2023 of the corresponding Taiwan patent application No. 111140265.

* cited by examiner

POWER CONVERTER

BACKGROUND

Technical Field

The present disclosure relates to a power converter, and more particularly to a power converter that can operate in half-bridge or full-bridge circuit topologies to provide multiple output voltages.

Description of Related Art

The statements in this section merely provide background information related to the present disclosure and do not necessarily constitute prior art.

When the power is greater than 100 watts, the power supply products usually use the topology of PFC plus LLC. The main reason is that LLC has the characteristic of zero voltage switching, which enables the power supply products to operate at higher frequencies, thereby reducing the size of the magnetic components and reducing the size of the power supply products.

Such as the above-mentioned structure of the first stage PFC plus the second stage LLC is a very common power supply design structure. However, in response to the increasingly sophisticated technology, the voltages required are not the same when there are many 3C products. Therefore, the specifications of power supply products with different output voltages have become more and more popular. However, since the optimal efficiency operation point of LLC is the resonant frequency point, a stable input voltage and a stable output voltage must be maintained at this resonant frequency point, LLC is usually not an optimal solution under a single output voltage.

SUMMARY

An objective of the present disclosure is to provide a power converter to solve the problems of existing technology.

In order to achieve the above-mentioned objective, the power converter includes a primary-side rectifying/filtering circuit, a DC converter, a DC-DC converter, a primary-side controller, a secondary-side rectifying controller, and a secondary-side feedback controller. The primary-side rectifying/filtering circuit receives an input voltage, and rectifies and filters the input voltage into an adjusted input voltage. The DC converter is coupled to the primary-side rectifying/filtering circuit, and receives the adjusted input voltage. The DC-DC converter is coupled to the DC converter. The primary-side controller is coupled to the DC converter and the DC-DC converter, and provides a first control signal to control the DC converter to convert the adjusted input voltage into a DC input voltage, and provides a second control signal to control the DC-DC converter. The secondary-side rectifying controller is coupled to the DC-DC converter, and provides a third control signal to control the DC-DC converter to convert the DC input voltage into a conversion voltage to supply power to a load according to a gain condition. The secondary-side feedback controller is coupled to the primary-side controller and the secondary-side rectifying controller, and the secondary-side feedback controller receives a power demand signal provided by the load to control the primary-side controller and the secondary-side rectifying controller.

In one embodiment, the secondary-side feedback controller provides a feedback control signal to the primary-side controller, and provides a rectifying control signal to the secondary-side rectifying controller. The feedback control signal includes an AC-DC feedback control signal and a DC-DC feedback control signal. The primary-side controller controls the DC converter according to the AC-DC feedback control signal, controls the DC-DC converter according to the DC-DC feedback control signal, and controls the secondary-side rectifying controller and adjusts the gain condition according to the rectifying control signal.

In one embodiment, the DC-DC converter includes a primary-side isolating circuit and a secondary-side isolating circuit. The primary-side isolating circuit is coupled to the DC converter and the primary-side controller, and receives the second control signal and the DC input voltage. The secondary-side isolating circuit is coupled to the secondary-side rectifying controller, and isolatedly converts the DC input voltage.

In one embodiment, the primary-side isolating circuit includes a bridge switching circuit and a resonance circuit. The primary-side isolating circuit includes a bridge synchronous rectifying circuit and a step-down conversion circuit.

In one embodiment, the bridge switching circuit includes an upper switch and a lower switch. A first end of the upper switch is coupled to the DC converter. A first end of the lower switch is coupled to a second end of the upper switch and the resonance circuit. The primary-side controller provides the second control signal to control the upper switch and the lower switch.

In one embodiment, the bridge synchronous rectifying circuit includes a first switch, a second switch, a third switch, a fourth switch, a first main resonance inductor, a second main resonance inductor, a first auxiliary resonance inductor, and a second auxiliary resonance inductor. A first end of the first auxiliary resonance inductor is coupled to a second end of the first switch, a second end of the first auxiliary resonance inductor is coupled to a first end of the second switch and a second end of the first main resonance inductor; a first end of the second auxiliary resonance inductor is coupled to a second end of the third switch, a second end of the second auxiliary resonance inductor is coupled to a first end of the fourth switch and a first end of the second main resonance inductor: a first end of the first main resonance inductor is coupled to a second end of the second main resonance inductor. A first end of the third switch coupled to a first end of the first switch and the step-down conversion circuit: a second end of the fourth switch is coupled to a second end of the second switch and the step-down conversion circuit. The secondary-side rectifying controller provides the third control signal to control the first switch, the second switch, the third switch, and the fourth switch.

In one embodiment, the bridge synchronous rectifying circuit further includes a first capacitor and a second capacitor. A first end of the first capacitor is coupled to the third switch. A first end of the second capacitor is coupled to a second end of the first capacitor, and a second end of the second capacitor is coupled to the fourth switch.

In one embodiment, the step-down conversion circuit includes a fifth switch, a sixth switch, a diode, an inductor, and a capacitor. A first end of the fifth switch is coupled to the first end of the third switch. A first end of the sixth switch is coupled to the first end of the first main resonance inductor and the second end of the second main resonance inductor, and a second end of the sixth switch is coupled to a second end of the fifth switch. A cathode of the diode is coupled to the second end of the fifth switch and the second end of the sixth switch. A first end of the inductor is coupled to the cathode of the diode. A first end of the capacitor is coupled to a second end of the inductor, and a second end of the capacitor is coupled to an anode of the diode and a second end of the fourth switch.

In one embodiment, when the conversion voltage is a first voltage, the first switch and the third switch are turned off, and the second switch and the fourth switch are alternately switched on so that the first main resonance inductor or the second main resonance inductor is excited.

In one embodiment, when the second switch is turned on, a first excitation path including the second switch, the first main resonance inductor, and the step-down conversion circuit is formed to excite the first main resonance inductor; when the fourth switch is turned on, a second excitation path comprising the fourth switch, the second main resonance inductor, and the step-down conversion circuit is formed to excite the second main resonance inductor.

In one embodiment, when the conversion voltage is a first voltage, the second switch and the fourth switch are turned off, and the first switch and the third switch are alternately switched on so that the first main resonance inductor or the second main resonance inductor is excited.

In one embodiment, when the first switch is turned on, a third excitation path including the first switch, the first main resonance inductor, and the step-down conversion circuit is formed to excite the first main resonance inductor; when the third switch is turned on, a fourth excitation path comprising the third switch, the second main resonance inductor, and the step-down conversion circuit is formed to excite the second main resonance inductor.

In one embodiment, when the conversion voltage is a second voltage, the first switch and the fourth switch are simultaneously turned on and turned off, the second switch and the third switch are simultaneously turned on and turned off, and the first switch and the third switch are alternately switched on so that the first main resonance inductor and the second main resonance inductor, and the first auxiliary resonance inductor or the second auxiliary resonance inductor are excited.

In one embodiment, when the first switch and the fourth switch are simultaneously turned on, a first excitation path including the first switch, the first auxiliary resonance inductor, the first main resonance inductor, the second main resonance inductor, the fourth switch, and the step-down conversion circuit is formed; when the second switch and the third switch are simultaneously turned on, a second excitation path comprising the second switch, the first main resonance inductor, the second main resonance inductor, the second auxiliary resonance inductor, the third switch, and the step-down conversion circuit is formed.

In one embodiment, an operation frequency of the primary-side isolating circuit is greater than a resonance frequency to adjust an output voltage of the power converter.

In one embodiment, a voltage of a front-stage power factor correction circuit is decreased to adjust an output voltage of the power converter.

In one embodiment, when the conversion voltage is less than the first voltage, the step-down conversion circuit is turned on by the fifth switch and the sixth switch.

In one embodiment, when the conversion voltage is less than the second voltage, the step-down conversion circuit is turned on by the fifth switch and the sixth switch.

In one embodiment, the step-down conversion circuit is used to convert the conversion voltage into a DC output voltage.

In one embodiment, a duty cycle of the fifth switch or a duty cycle of the sixth switch is controlled to step down the conversion voltage into the DC output voltage with different magnitudes.

Accordingly, the power converter can operate in half-bridge or full-bridge circuit topologies to flexibly provide multiple output voltages. Moreover, the output voltage can meet the requirements of a wider range of voltages by the design of different winding turns ratios of the first main resonance inductor, the second main resonance inductor, the first auxiliary resonance inductor, and the second auxiliary resonance inductor.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
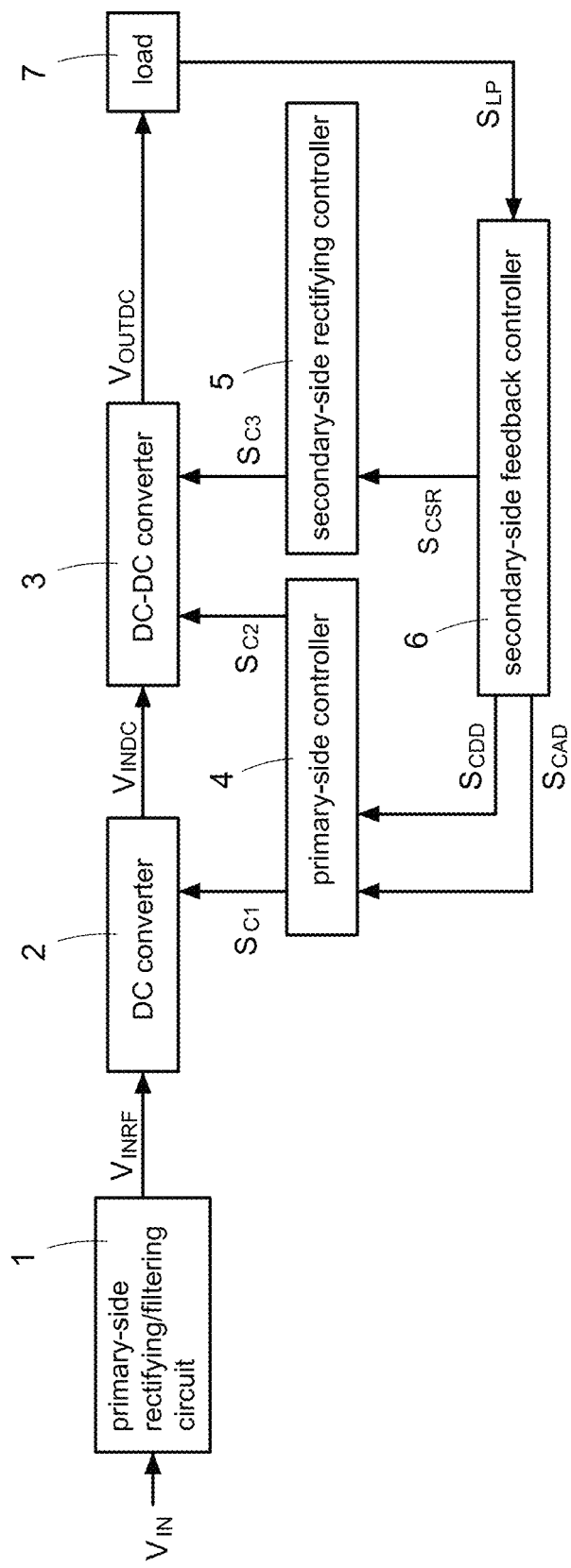
FIG. 1 is a structural block diagram of a power converter according to the present disclosure.

Reference will now be made to the drawing figures to describe the present disclosure in detail. It will be understood that the drawing figures and exemplified embodiments of present disclosure are not limited to the details thereof.

Figure 2:
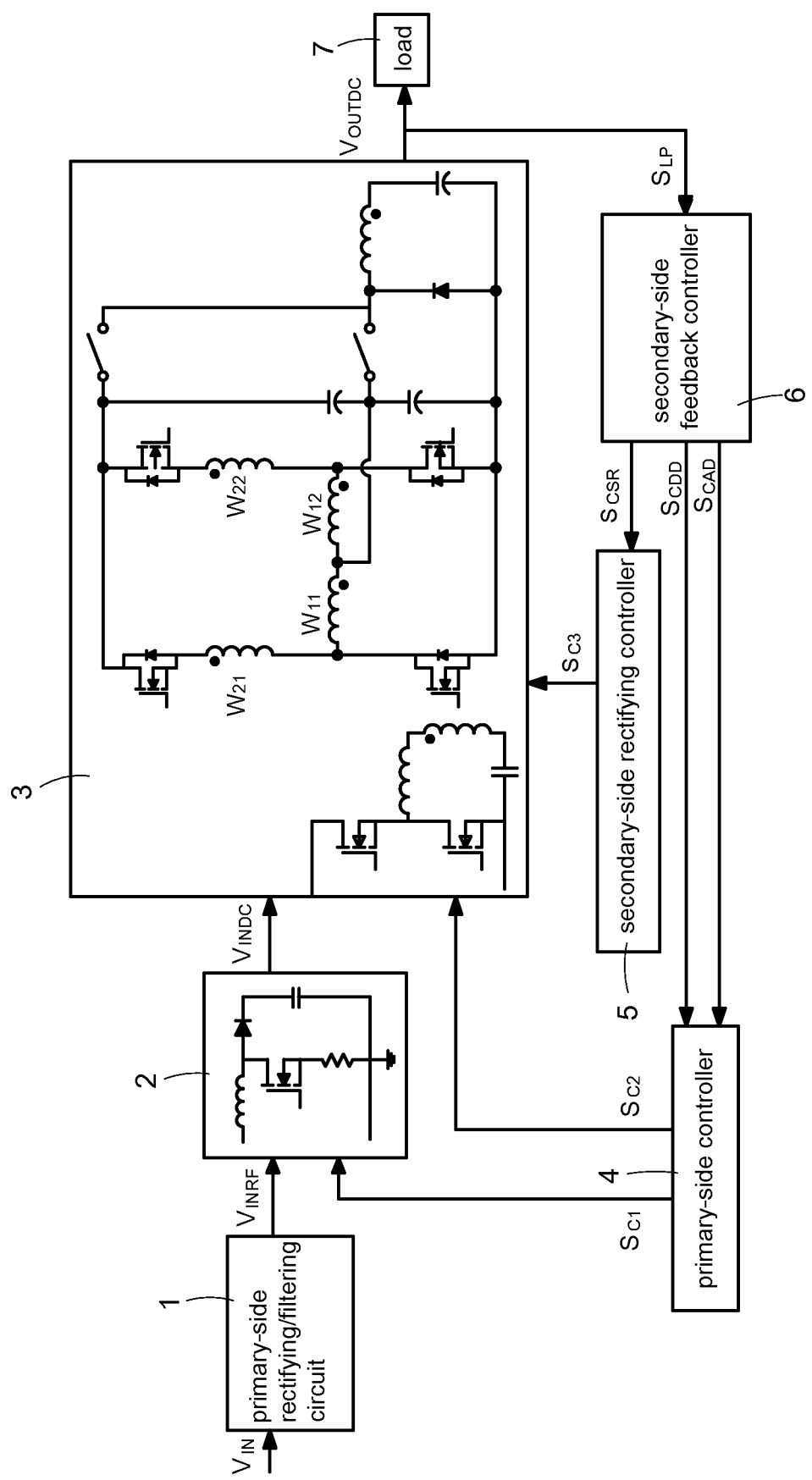
FIG. 2 is a detailed block diagram of the power converter according to the present disclosure.

Please refer to FIG. 1 and FIG. 2, which respectively show a structural block diagram and a detailed block diagram of a power converter according to the present disclosure. The power converter with step-down and step-up (buck-boost) conversion includes a primary-side rectifying/filtering circuit 1, a DC converter 2, a DC-DC converter 3, a primary-side controller 4, a secondary-side rectifying controller 5, and a secondary-side feedback controller 6.

The primary-side rectifying/filtering circuit I receive an input voltage $V_{IN}$, and rectifies and filters the input voltage $V_{IN}$ into an adjusted input voltage $V_{INRF}$. Specifically, the primary-side rectifying/filtering circuit 1 includes a primary-side rectifying circuit and a primary-side filtering circuit (not shown). The primary-side rectifying circuit is used to rectify the input voltage $V_{IN}$. The primary-side filtering circuit is sued to filter the rectified input voltage $V_{IN}$ to output the adjusted input voltage $V_{INRF}$ to the DC converter 2.

The DC converter 2 is coupled to the primary-side rectifying/filtering circuit 1, and receives the adjusted input voltage $V_{INRF}$ outputted from the primary-side rectifying/filtering circuit 1.

Figure 3:
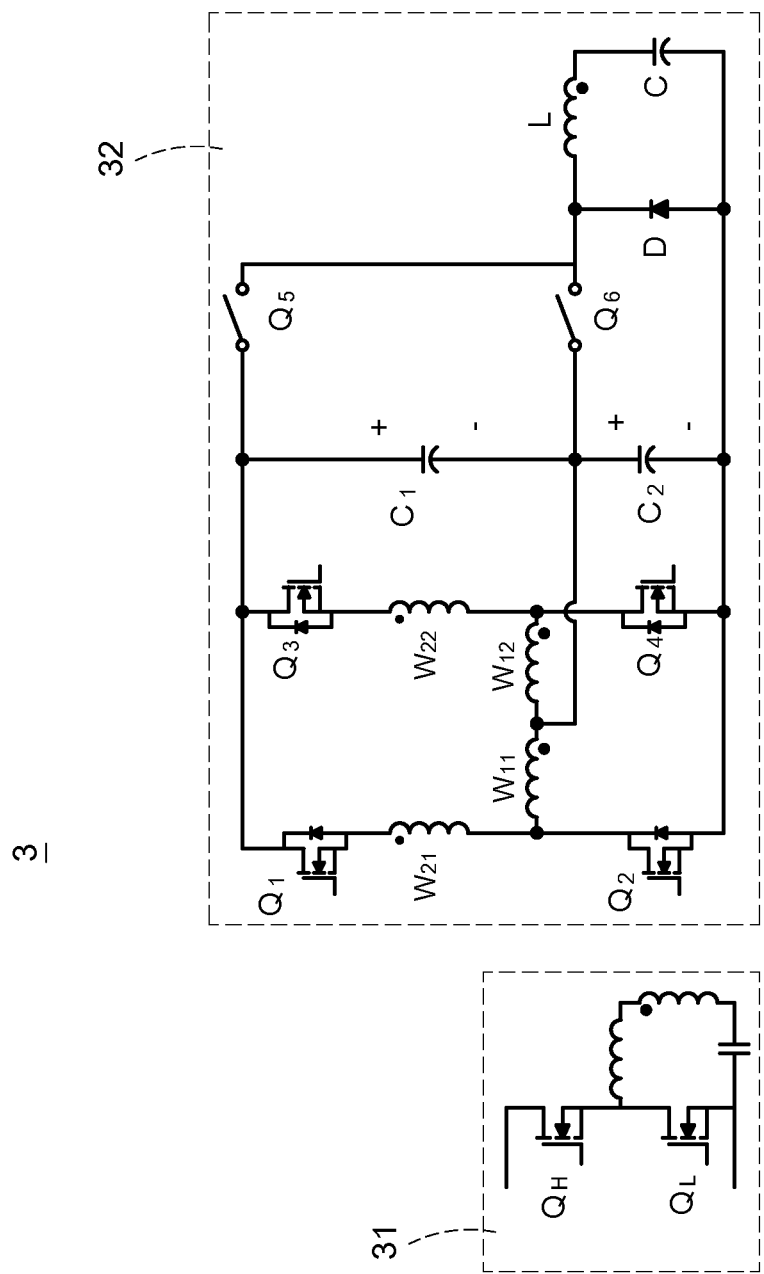
FIG. 3 and FIG. 4 are circuit diagrams of a DC-DC converter according to the present disclosure.
Figure 4:
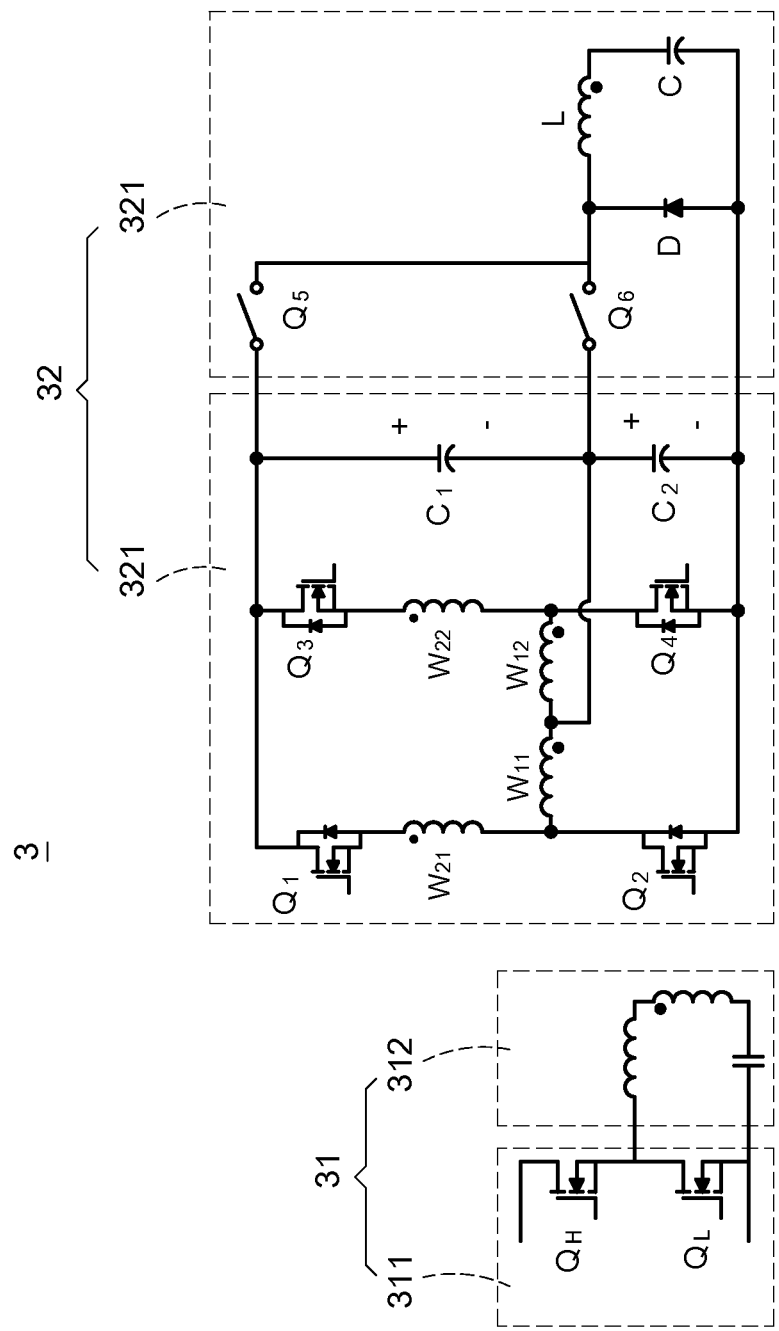

The DC-DC converter 3 is coupled to the DC converter 2. Please refer to FIG. 3 and FIG. 4, which show circuit diagrams of a DC-DC converter according to the present disclosure. Specifically, the DC-DC converter 3 includes a primary-side isolating circuit 31 and a secondary-side isolating circuit 32. The primary-side isolating circuit 31 is coupled to the DC converter 2 and the primary-side controller 4, and receives a second control signal $S_{C2}$ and the DC input voltage $V_{INDC}$. The secondary-side isolating circuit 32 is coupled to the secondary-side rectifying controller 5, and isolatedly converts the DC input voltage $V_{INDC}$.

The primary-side isolating circuit 31 includes a bridge switching circuit 311 and a resonance circuit 312. The bridge switching circuit 311 includes an upper switch $Q_H$ and a lower switch $Q_L$. A first end of the upper switch $Q_H$ is coupled to the DC converter 2. A first end of the lower switch $Q_L$ is coupled to a second end of the upper switch $Q_H$ and the resonance circuit 312. The primary-side controller 4 provides the second control signal $S_{C2}$ to control the upper switch $Q_H$ and the lower switch $Q_L$.

The primary-side isolating circuit 32 includes a bridge synchronous rectifying circuit 321 and a step-down conversion circuit 322. The bridge synchronous rectifying circuit 321 includes a first switch $Q_1$, a second switch $Q_2$, a third switch $Q_3$, a fourth switch $Q_4$, a first main resonance inductor $W_{11}$, a second main resonance inductor $W_{12}$, a first auxiliary resonance inductor $W_{21}$, and a second auxiliary resonance inductor $W_{22}$. In particular, the first main resonance inductor $W_{11}$, the second main resonance inductor $W_{12}$, the first auxiliary resonance inductor $W_{21}$, and the second auxiliary resonance inductor $W_{22}$ are respectively realized by main windings and auxiliary windings of the same inductive device (for example, but not limited to, a transformer). Therefore, voltages on the first main resonance inductor $W_{11}$, the second main resonance inductor $W_{12}$, the first auxiliary resonance inductor $W_{21}$, and the second auxiliary resonance inductor $W_{22}$ are proportional to the corresponding winding turns ratios.

A first end of the first auxiliary resonance inductor $W_{21}$ is coupled to the second end of the first switch $Q_1$, a second end of the first auxiliary resonance inductor $W_{21}$ is coupled to a first end of the second switch $Q_2$ and a first end of the first main resonance inductor $W_{11}$. A first end of the second auxiliary resonance inductor $W_{22}$ is coupled to the second end of the third switch $Q_3$, a second end of the second auxiliary resonance inductor $W_{22}$ is coupled to a first end of the fourth switch $Q_4$ and a first end of the second main resonance inductor $W_{12}$. In one embodiment, for example, but not limited to, the first ends of the first main resonance inductor $W_{11}$, the second main resonance inductor $W_{12}$, the first auxiliary resonance inductor $W_{21}$, and the second auxiliary resonance inductor $W_{22}$ are dotted ends: the second ends of the first main resonance inductor $W_{11}$, the second main resonance inductor $W_{12}$, the first auxiliary resonance inductor $W_{21}$, and the second auxiliary resonance inductor $W_{22}$ are non-dotted ends.

A first end of the third switch $Q_3$ is coupled to a first end of the first switch $Q_1$ and the step-down conversion circuit 322. A second end of the fourth switch $Q_4$ is coupled to a second end of the second switch $Q_2$ and the step-down conversion circuit 322. The secondary-side rectifying controller 5 provides a third control signal $S_{C3}$ to control the first switch $Q_1$, the second switch $Q_2$, the third switch $Q_3$, and the fourth switch $Q_4$.

The bridge synchronous rectifying circuit 321 further includes a first capacitor $C_1$ and a second capacitor $C_2$. A first end of the first capacitor $C_1$ is coupled to the first end of the third switch $Q_3$ and the first end of the first switch $Q_1$. A first end of the second capacitor $C_2$ is coupled to a second end of the first capacitor $C_1$, and the first end of the first main resonance inductor $W_{11}$ and the second end of the second main resonance inductor $W_{12}$ (i.e., a common-connected end of the first main resonance inductor $W_{11}$ and the second main resonance inductor $W_{12}$). A second end of the second capacitor $C_2$ is coupled to the second end of the fourth switch $Q_4$ and the second end of the second switch $Q_2$.

The step-down conversion circuit 322 is used to convert a conversion voltage $V_{CON}$ into a DC output voltage $V_{OUTDC}$. The step-down conversion circuit 322 includes a fifth switch $Q_5$, a sixth switch $Q_6$, a diode D, an inductor L, and a capacitor C. A first end of the fifth switch $Q_5$ is coupled to the first end of the third switch $Q_3$ and the first end of the first capacitor $C_1$. A first end of the sixth switch $Q_6$ is coupled to the first end of the first main resonance inductor $W_{11}$ and the second end of the second main resonance inductor $W_{12}$, and a second end of the sixth switch $Q6$ is coupled to a second end of the fifth switch $Q5$. A cathode of the diode D is coupled to the second end of the fifth switch $Q5$ and the second end of the sixth switch $Q6$. A first end of the inductor L is coupled to the cathode of the diode D. A first end of the capacitor C is coupled to a second end of the inductor L, and a second end of the capacitor C is coupled to an anode of the diode D and a second end of the fourth switch $Q_4$. In one embodiment, the sixth switch $Q6$ may be implemented with back-to-back semiconductor components, but this does not limit the present disclosure.

The primary-side controller 4 is coupled to the DC converter 2 and the DC-DC converter 3, and provides a first control signal $S_{C1}$ to control the DC converter 2 to convert the adjusted input voltage $V_{INRF}$ into a DC input voltage $V_{INDC}$, and provide the second control signal $S_{C2}$ to control the DC-DC converter 3.

The secondary-side rectifying controller 5 is coupled to the DC-DC converter 3, and provides the third control signal $S_{C3}$ to control the DC-DC converter 3 to convert the DC input voltage $V_{INDC}$ into the conversion voltage $V_{CON}$ to supply power to a load 7 according to a gain condition.

The secondary-side feedback controller 6 is coupled to the primary-side controller 4 and the secondary-side rectifying controller 5. The secondary-side feedback controller 6 receives a power demand signal $S_{LP}$ provided by the load 7 to control the primary-side controller 4 and the secondary-side rectifying controller 5. Specifically, the secondary-side feedback controller 6 provides a feedback control signal to the primary-side controller 4, and provides a rectifying control signal $S_{CSR}$ to the secondary-side rectifying controller 5. The feedback control signal includes an AC-DC feedback control signal $S_{CAD}$ and a DC-DC feedback control signal $S_{CDD}$.

The primary-side controller 4 controls the DC converter 2 according to the AC-DC feedback control signal $S_{CAD}$, controls the DC-DC converter 3 according to the DC-DC feedback control signal $S_{CDD}$, and controls the secondary-side rectifying controller 5 and adjusts the gain condition according to the rectifying control signal $S_{CSR}$.

When the bridge synchronous rectifying circuit 321 operates as a half-bridge circuit, the conversion voltage $V_{CON}$ is a first voltage, such as but not limited to 20 volts, the third control signal $S_{C3}$ turns off the first switch $Q_1$ and the third switch $Q_3$, and alternately switches on the second switch $Q_2$ and the fourth switch $Q_4$ so that the first main resonance inductor $W_{11}$ or the second main resonance inductor $W_{12}$ is excited. In this embodiment, when the second switch $Q_2$ is turned on, a first excitation path including the second switch $Q_2$, the first main resonance inductor $W_{11}$, and the step-down conversion circuit 322 is formed to excite the first main resonance inductor $W_{11}$. When the fourth switch $Q_4$ is turned on, a second excitation path including the fourth switch $Q_4$, the second main resonance inductor $W_{12}$, and the step-down conversion circuit 322 is formed to excite the second main resonance inductor $W_{12}$.

In a symmetrical circuit operation: when the conversion voltage $V_{CON}$ is a first voltage, the third control signal $S_{C3}$ turns off the second switch $Q_2$ and the fourth switch $Q_4$, and alternately switches on the first switch $Q_1$ and the third switch $Q_3$ so that the first main resonance inductor $W_{11}$ or the second main resonance inductor $W_{12}$ is excited. In this embodiment, when the first switch $Q_1$ is turned on, a third excitation path including the first switch $Q_1$, the first main resonance inductor $W_{11}$, and the step-down conversion circuit 322 is formed to excite the first main resonance inductor $W_{11}$. When the third switch $Q_3$ is turned on, a fourth excitation path including the third switch $Q_3$, the second main resonance inductor $W_{12}$, and the step-down conversion circuit 322 is formed to excite the second main resonance inductor $W_{12}$.

When the conversion voltage $V_{CON}$ is less than the first voltage (i.e., less than 20 volts), the step-down conversion circuit 322 is turned on by the fifth switch Q5 and the sixth switch Q6. Specifically, a duty cycle of the fifth switch Q5 or a duty cycle of the sixth switch Q6 is controlled to step down the conversion voltage $V_{CON}$ into the DC output voltage $V_{OUTDC}$ with different magnitudes.

However, under the full-bridge operation that requires double voltage output, when only the first main resonance inductor $W_{11}$ and the second main resonance inductor $W_{12}$ are used (that is, the first auxiliary resonance inductor $W_{21}$ and the second auxiliary resonance inductor $W_{22}$ are absent), there is a fixed multiple between the output voltage and the input voltage (for example, two times). Therefore, to realize the voltage relationship between the output voltage and the input voltage that is not a fixed multiple, for example, the input voltage is 20 volts and the output voltage of 48 volts, it is necessary to increase the input voltage of the front-stage power factor correction (PFC) circuit (for example, from 400 volts to 480 volts) so as to make it possible to provide the output voltage of 48 volts through the two-time voltage gain. However, the volume of the bulk capacitor must be increased to increase the voltage through the front-stage PFC, which is not conducive to the design of the miniaturized system.

Therefore, the present disclosure further optimizes the circuit design by using the first auxiliary resonance inductor $W_{21}$ and the second auxiliary resonance inductor $W_{22}$. Specifically, by designing winding turns ratios of the first main resonance inductor $W_{11}$, the second main resonance inductor $W_{12}$, the first auxiliary resonance inductor $W_{21}$, and the second auxiliary resonance inductor $W_{22}$ to achieve the circuit design optimization.

For example, but not limited to, winding turns ratios of the first main resonance inductor $W_{11}$, the second main resonance inductor $W_{12}$, the first auxiliary resonance inductor $W_{21}$ are designed to be 2:2:1:1, and therefore under the full-bridge operation (i.e., under the double-voltage operation), a voltage across the first main resonance inductor $W_{11}$ is 20 volts (referred to as a first voltage), a voltage across the second main resonance inductor $W_{12}$ is 20 volts (referred to as a second voltage), a voltage across the first auxiliary resonance inductor $W_{21}$ is 10 volts (referred to as a third voltage), and a voltage across the second auxiliary resonance inductor $W_{22}$ is 10 volts (referred to as a fourth voltage). Under the full-bridge operation in which the second switch $Q_2$ and the third switch $Q_3$ are turned on, the sum of voltages across the first capacitor $C_1$ and the second capacitor $C_2$ is 50 volts, that is, the sum of the first voltage, the second voltage, and the fourth voltage. Similarly, under the full-bridge operation in which the first switch $Q_1$ and the fourth switch $Q_4$ are turned on, the sum of voltages across the first capacitor $C_1$ and the second capacitor $C_2$ is 50 volts, that is, the sum of the first voltage, the second voltage, and the third voltage.

In the above-mentioned output voltage state, the output voltage of 50 volts may be corrected/adjusted to the output voltage of 48 volts through two manners. The first manner: by increasing an operation frequency of the LLC circuit (that is, the primary-side isolating circuit 31) to be greater than the resonance frequency, the voltage gain will be slightly decreased to achieve the output voltage of 48 volts. Therefore, it is no longer necessary to increase the voltage of the front-stage PFC so it is not necessary to select a large capacitor with a larger volume. The second manner: without increasing the operation frequency of the LLC circuit, the output voltage of 48 volts can be directly outputted by decreasing the voltage of the front-stage PFC (for example, from 400 volts to 380 volts) so as to make it possible to provide the output voltage of 48 volts through the two-time voltage gain. That is, the first voltage and the second voltage are slightly less than 20 volts, and the third voltage and the fourth voltage are slightly less than 10 volts, and therefore the sum of the first voltage, the second voltage, and the third voltage or the sum of the first voltage, the second voltage, and the fourth voltage directly reaches 48 volts. Accordingly, the volume of the large capacitor can be reduced, which is beneficial to the design of the design of the miniaturized system, and also the power conversion efficiency can be improved.

Moreover, in the present disclosure, the output voltage can meet the requirements of a wider range of voltages by the design of different winding turns ratios of the first main resonance inductor $W_{11}$, the second main resonance inductor $W_{12}$, the first auxiliary resonance inductor $W_{21}$, and the second auxiliary resonance inductor $W_{22}$.

When the bridge synchronous rectifying circuit 321 operates as a full-bridge circuit to provide the double voltage output, the conversion voltage $V_{CON}$ is a second voltage, such as but not limited to 48 or 36 volts, the third control signal $S_{C3}$ simultaneously turns on and turns off the first switch $Q_1$ and the fourth switch $Q_4$, simultaneously turns on and turns off the second switch $Q_2$ and the third switch $Q_3$, and alternately switches on the first switch $Q_1$ and the second switch $Q_2$ so that the first main resonance inductor $W_{11}$ and the second main resonance inductor $W_{12}$, and the first auxiliary resonance inductor $W_{21}$ or the second auxiliary resonance inductor $W_{22}$. Specifically, when the first switch $Q_1$ and the fourth switch $Q_4$ are simultaneously turned on, the first excitation path includes the first switch $Q_1$, the first auxiliary resonance inductor $W_{21}$, the first main resonance inductor $W_{11}$, the second main resonance inductor $W_{12}$, the fourth switch $Q_4$, and the step-down conversion circuit 322 so that the first main resonance inductor $W_{11}$, the second main resonance inductor $W_{12}$, and the first auxiliary resonance inductor $W_{21}$ are simultaneously excited. When the second switch $Q_2$ and the third switch $Q_3$ are simultaneously turned on, the second excitation path includes the second switch $Q_2$, the first main resonance inductor $W_{11}$, the second main resonance inductor $W_{12}$, and the second auxiliary resonance inductor $W_{22}$, the third switch $Q_3$, and the step-down conversion circuit 322 so that the first main resonance inductor $W_{11}$, the second main resonance inductor $W_{12}$, and the second auxiliary resonance inductor $W_{22}$ are simultaneously excited.

When the conversion voltage $V_{CON}$ is less than the second voltage (i.e., less than 48 or 36 volts), the step-down conversion circuit 322 is turned on by the fifth switch Q5 and the sixth switch Q6. Specifically, a duty cycle of the fifth switch Q5 or a duty cycle of the sixth switch Q6 is controlled to step down the conversion voltage $V_{CON}$ into the DC output voltage $V_{OUTDC}$ with different magnitudes.

Accordingly, the power converter can operate in half-bridge or full-bridge circuit topologies to flexibly provide multiple output voltages. Moreover, the output voltage can meet the requirements of a wider range of voltages by the design of different winding turns ratios of the first main resonance inductor $W_{11}$, the second main resonance inductor $W_{12}$, the first auxiliary resonance inductor $W_{21}$, and the second auxiliary resonance inductor $W_{22}$.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter, comprising:
   a primary-side rectifying/filtering circuit, configured to receive an input voltage, and rectify and filter the input voltage into an adjusted input voltage,
   a DC converter, coupled to the primary-side rectifying/filtering circuit, and configured to receive the adjusted input voltage,
   a DC-DC converter, coupled to the DC converter,
   a primary-side controller, coupled to the DC converter and the DC-DC converter, and configured to provide a first control signal to control the DC converter to convert the adjusted input voltage into a DC input voltage, and provide a second control signal to control the DC-DC converter,
   a secondary-side rectifying controller, coupled to the DC-DC converter, and configured to provide a third control signal to control the DC-DC converter to convert the DC input voltage into a conversion voltage to supply power to a load according to a gain condition, and
   a secondary-side feedback controller, coupled to the primary-side controller and the secondary-side rectifying controller, and the secondary-side feedback controller configured to receive a power demand signal provided by the load to control the primary-side controller and the secondary-side rectifying controller.

2. The power converter as claimed in claim 1, wherein the secondary-side feedback controller provides a feedback control signal to the primary-side controller, and provides a rectifying control signal to the secondary-side rectifying controller, wherein the feedback control signal comprises an AC-DC feedback control signal and a DC-DC feedback control signal,
   wherein the primary-side controller controls the DC converter according to the AC-DC feedback control signal, controls the DC-DC converter according to the DC-DC feedback control signal, and controls the secondary-side rectifying controller and adjusts the gain condition according to the rectifying control signal.

3. The power converter as claimed in claim 1, wherein the DC-DC converter comprises:
   a primary-side isolating circuit, coupled to the DC converter and the primary-side controller, and configured to receive the second control signal and the DC input voltage, and
   a secondary-side isolating circuit, coupled to the secondary-side rectifying controller, and configured to isolatedly convert the DC input voltage.

4. The power converter as claimed in claim 3, wherein the primary-side isolating circuit comprises a bridge switching circuit and a resonance circuit; the primary-side isolating circuit comprises a bridge synchronous rectifying circuit and a step-down conversion circuit.

5. The power converter as claimed in claim 4, wherein the bridge switching circuit comprises:
   an upper switch, a first end of the upper switch coupled to the DC converter, and
   a lower switch, a first end of the lower switch coupled to a second end of the upper switch and the resonance circuit,
   wherein the primary-side controller provides the second control signal to control the upper switch and the lower switch.

6. The power converter as claimed in claim 4, wherein the bridge synchronous rectifying circuit comprises:
   a first switch, a second switch, a third switch, a fourth switch;
   a first main resonance inductor and a second main resonance inductor; and
   a first auxiliary resonance inductor and a second auxiliary resonance inductor;
   wherein a first end of the first auxiliary resonance inductor is coupled to a second end of the first switch, a second end of the first auxiliary resonance inductor is coupled to a first end of the second switch and a second end of the first main resonance inductor; a first end of the second auxiliary resonance inductor is coupled to a second end of the third switch, a second end of the second auxiliary resonance inductor is coupled to a first end of the fourth switch and a first end of the second main resonance inductor; a first end of the first main resonance inductor is coupled to a second end of the second main resonance inductor;
   wherein a first end of the third switch coupled to a first end of the first switch and the step-down conversion circuit; a second end of the fourth switch is coupled to a second end of the second switch and the step-down conversion circuit;
   wherein the secondary-side rectifying controller provides the third control signal to control the first switch, the second switch, the third switch, and the fourth switch.

7. The power converter as claimed in claim 6, wherein the bridge synchronous rectifying circuit further comprises:
   a first capacitor, a first end of the first capacitor coupled to the third switch, and
   a second capacitor, a first end of the second capacitor coupled to a second end of the first capacitor, and a second end of the second capacitor coupled to the fourth switch.

8. The power converter as claimed in claim 6, wherein the step-down conversion circuit comprises:
   a fifth switch, a first end of the fifth switch coupled to the first end of the third switch,
   a sixth switch, a first end of the sixth switch coupled to the first end of the first main resonance inductor and the second end of the second main resonance inductor, and a second end of the sixth switch coupled to a second end of the fifth switch,
   a diode, a cathode of the diode coupled to the second end of the fifth switch and the second end of the sixth switch, an inductor, a first end of the inductor coupled to the cathode of the diode, and a capacitor, a first end of the capacitor coupled to a second end of the inductor, and a second end of the capacitor coupled to an anode of the diode and a second end of the fourth switch.

9. The power converter as claimed in claim 6, wherein when the conversion voltage is a first voltage, the first switch and the third switch are turned off, and the second switch and the fourth switch are alternately switched on so that the first main resonance inductor or the second main resonance inductor is excited.

10. The power converter as claimed in claim 9, wherein when the second switch is turned on, a first excitation path comprising the second switch, the first main resonance inductor, and the step-down conversion circuit is formed to excite the first main resonance inductor; when the fourth switch is turned on, a second excitation path comprising the fourth switch, the second main resonance inductor, and the step-down conversion circuit is formed to excite the second main resonance inductor.

11. The power converter as claimed in claim 6, wherein when the conversion voltage is a first voltage, the second switch and the fourth switch are turned off, and the first switch and the third switch are alternately switched on so that the first main resonance inductor or the second main resonance inductor is excited.

12. The power converter as claimed in claim 11, wherein when the first switch is turned on, a third excitation path comprising the first switch, the first main resonance inductor, and the step-down conversion circuit is formed to excite the first main resonance inductor; when the third switch is turned on, a fourth excitation path comprising the third switch, the second main resonance inductor, and the step-down conversion circuit is formed to excite the second main resonance inductor.

13. The power converter as claimed in claim 6, wherein when the conversion voltage is a second voltage, the first switch and the fourth switch are simultaneously turned on and turned off, the second switch and the third switch are simultaneously turned on and turned off, and the first switch and the third switch are alternately switched on so that the first main resonance inductor and the second main resonance inductor, and the first auxiliary resonance inductor or the second auxiliary resonance inductor are excited.

14. The power converter as claimed in claim 12, wherein when the first switch and the fourth switch are simultaneously turned on, a first excitation path comprising the first switch, the first auxiliary resonance inductor, the first main resonance inductor, the second main resonance inductor, the fourth switch, and the step-down conversion circuit is formed; when the second switch and the third switch are simultaneously turned on, a second excitation path comprising the second switch, the first main resonance inductor, the second main resonance inductor, the second auxiliary resonance inductor, the third switch, and the step-down conversion circuit is formed.

15. The power converter as claimed in claim 6, wherein an operation frequency of the primary-side isolating circuit is greater than a resonance frequency to adjust an output voltage of the power converter.

16. The power converter as claimed in claim 6, wherein a voltage of a front-stage power factor correction circuit is decreased to adjust an output voltage of the power converter.

17. The power converter as claimed in claim 9, wherein when the conversion voltage is less than the first voltage, the step-down conversion circuit is turned on by the fifth switch and the sixth switch.

18. The power converter as claimed in claim 13, wherein when the conversion voltage is less than the second voltage, the step-down conversion circuit is turned on by the fifth switch and the sixth switch.

19. The power converter as claimed in claim 6, wherein the step-down conversion circuit is used to convert the conversion voltage into a DC output voltage.

20. The power converter as claimed in claim 19, wherein a duty cycle of the fifth switch or a duty cycle of the sixth switch is controlled to step down the conversion voltage into the DC output voltage with different magnitudes.

* * * * *